Nov. 10, 1953     J. B. POLOMSKI, JR     2,658,592
BRAKING SYSTEM
Filed Oct. 7, 1950
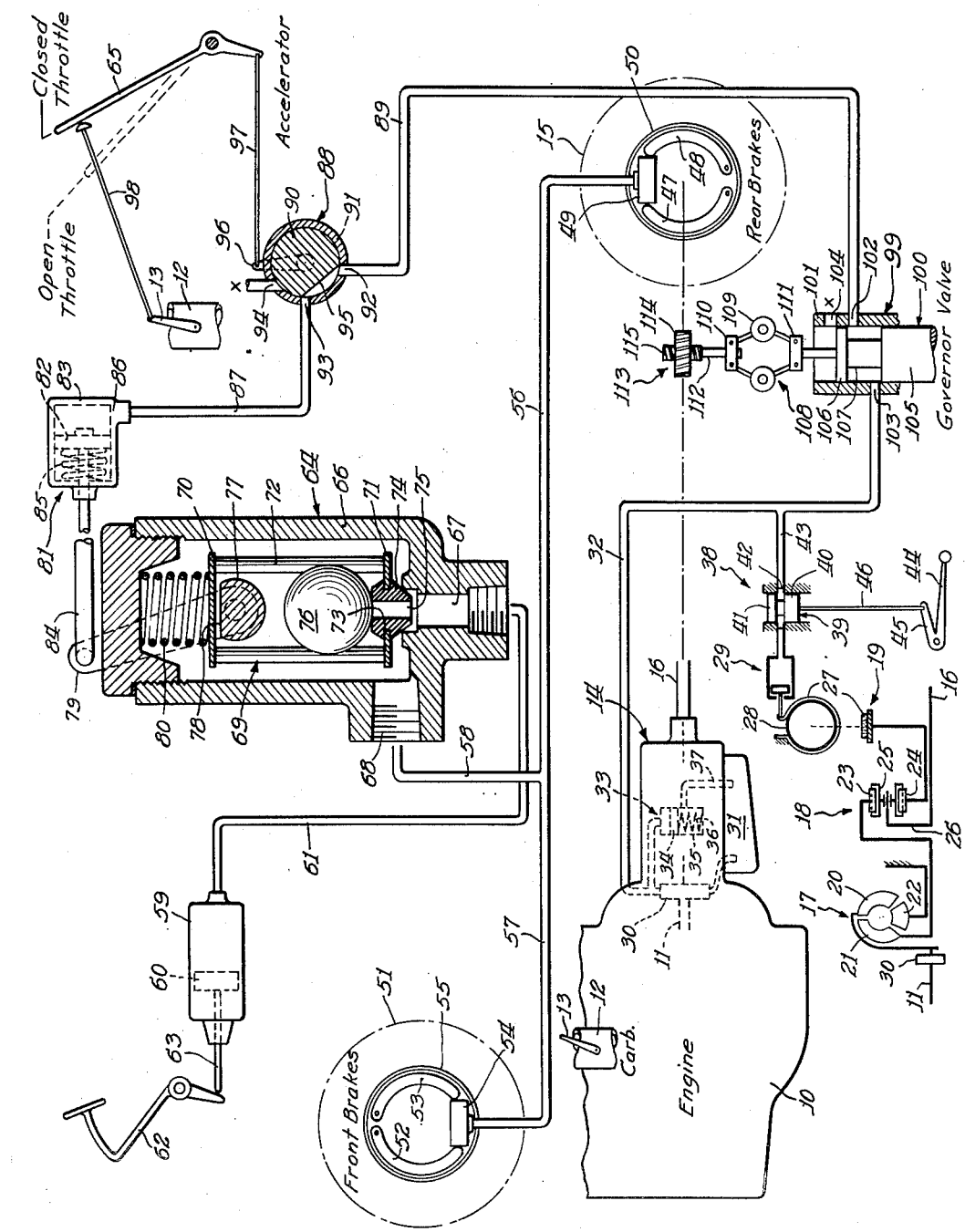
Inventor:
JOHN B. POLOMSKI, JR.

Patented Nov. 10, 1953

2,658,592

UNITED STATES PATENT OFFICE 2,658,592

BRAKING SYSTEM

John B. Polomski, Jr., Detroit, Mich., assignor to Borg-Warner Corporation, Chicago, Ill., a corporation of Illinois Application October 7, 1950, Serial No. 188,919

1 Claim. (Cl. 192—3)

My invention relates to brake systems and particularly to such systems for automotive vehicles.

Automotive vehicles are quite usually equipped with transmissions comprising hydrodynamic coupling devices and particularly hydraulic torque converters, the speed and torque output of which is dependent on the speed and torque applied to the coupling device from the engine of the vehicle. A power train including such a hydrodynamic device may be maintained completed through the transmission for all forward driving, and, when it is desired to stop the vehicle, the vehicle brakes are simply applied, and the torque transmitted by the hydrodynamic coupling device with the engine running at idling speed is relatively quite small. It has been found, however, that this torque transmitted by the hydrodynamic device, with the engine idling, under some conditions, such as when the lubricated parts of the vehicle are warm and therefore move easily, is sufficient to cause the vehicle to move slowly when the vehicle brakes are released, so that it is necessary for the vehicle operator to keep the vehicle brakes applied.

It is an object of the present invention to provide an improved braking system which counteracts the torque transmitted by the hydrodynamic coupling at idling speeds of the vehicle engine and prevents such movement of the vehicle under this torque. More particularly it is an object of the present invention to provide a mechanism which will keep the vehicle brakes engaged even though the vehicle brake pedal is released, after the vehicle brakes have been previously engaged under the control of the vehicle operator, as long as the vehicle accelerator is in a closed throttle position and the vehicle is travelling below a certain low speed, and to this end it is an object to provide such a braking system under the control of both a governor mechanism driven in timed relationship with the output shaft of the transmission and also the vehicle accelerator.

The invention consists of the novel constructions, arrangements and devices to be hereinafter described and claimed for carrying out the above stated objects and such other objects as will appear from the following description of a preferred embodiment of the invention, illustrated in the accompanying drawing which shows diagrammatically the preferred embodiment of the invention in conjunction with an automotive engine and a transmission comprising a hydraulic torque converter.

Referring now to the drawing, the automotive drive system illustrated comprises an automotive vehicle driving engine 10 having a crank shaft 11 which is the output shaft of the engine and having a carburetor 12 with a throttle lever 13. The engine is connected through a transmission indicated generally at 14 with driving road wheels 15, the connection between the transmission 14 and the wheels 15 being of any suitable and well known construction.

The transmission 14 comprises a drive shaft which is the engine crank shaft 11, a driven shaft 16, a hydraulic torque converter 17, a planetary gear set 18 and a brake 19. The hydraulic torque converter comprises a bladed impeller 20, a bladed runner 21 and a bladed stator 22. The impeller 20 is connected with the drive shaft 11 to be driven thereby. The planetary gear set 18 comprises a ring gear 23, a sun gear 24, a plurality of planet gears 25 in mesh with the sun and ring gears and a planet gear carrier 26. The planet gear carrier 26 is connected with the driven shaft 16 of the transmission 14 which drives the road wheels 15 through any suitable connection, previously mentioned. The sun gear 24 constitutes a reaction member for the planetary gear set 18, and the brake 19 is provided for braking the sun gear 24 to complete a power train through the transmission. The brake 19 comprises a brake band 27 adapted to engage a brake drum 28 connected with the sun gear 24.

The brake 19 is hydraulically actuated by means of a hydraulic servomotor 29. A pump 30 driven by the drive shaft 11 of the transmission is provided to draw fluid from a sump 31 at the bottom of the transmission and supply it to a fluid pressure conduit 32. A relief valve 33 is connected with the conduit 32 and comprises a piston 34 slidably disposed in a casing 35 and acted on by a spring 36 so as to relieve fluid from the conduit 32 through a relief passage 37 and maintain the pressure in the conduit 32 at a predetermined maximum value. A valve 38 comprising a piston 39 having lands 40 and 41 and a groove 42 therebetween is provided in a conduit 43 connecting the pressure conduit 32 and the servomotor 29. The valve piston 39 is arranged to be moved by means of a manual control lever 44 through the medium of a lever 45 movable with the lever 44 and a link 46 connected between the lever 45 and the piston 39.

A power train is completed through the transmission by moving the valve piston 39 from a position blocking the conduit 43 into its illustrated position connecting the servomotor 29 with the regulated fluid pressure conduit 32 through the groove 42 of the valve piston. The servomotor 29 is actuated by the fluid under pressure in the conduit 32 to engage the brake band 27 on the drum 28 for braking the sun gear 24, and the power train is thus completed. The fluid pressure in the conduit 32 is supplied from the pump 30 driven by the drive shaft 11 which is always rotating when the engine 10 is in operation. The pump 30 draws fluid from the transmission sump 31 and discharges it into the conduit 32, and it is maintained at a predetermined maximum in this conduit due to the action of the relief valve 33. The piston 34 in the relief valve moves downwardly as seen in the figure against the action of the spring 36 and meters fluid from the pump 30 through the discharge passage 37 allowing any excess fluid which would raise the fluid pressure in the conduit 32 above the predetermined desired maximum to be released through the discharge passage 37 back into the sump 31.

The power train through the transmission is from the drive shaft 11 through the torque converter 17, from its impeller 20 to its runner 21, to the ring gear 23 of the gear set 18 and through the planet gears 25 and planet gear carrier 26 to the driven shaft 16, and the drive proceeds from thence to the road wheels 15 of the vehicle. The planet gear carrier 26 is driven at reduced speed and increased torque with respect to the speed and torque of the ring gear 23 due to the action of the planet gear set 18, and the sun gear 24 is held stationary by the brake 19 which is engaged by its servomotor 29 so that the sun gear 24 functions as the reaction element of the gear set. It is contemplated that this power train shall remain completed even when the vehicle is at a stop by means of the vehicle brakes and with the vehicle engine idling. The hydraulic torque converter 17 has its impeller 20 rotated at the idling speed of the vehicle engine, and it therefore transmits a minimum of torque to the runner 21 and through the planet gear set 18 to the driven shaft 16 and the road wheels 15. Under some conditions, this minimum torque is sufficient for causing the vehicle to move ahead slowly when the vehicle brakes are subsequently released, and in order to prevent such movement of the vehicle which is undesired when the vehicle is stopped at a traffic signal, for example, I have provided my improved braking system which will now be described.

The vehicle is provided with the usual wheel brakes, the brakes for each of the rear road wheels 15 comprising brake shoes 47 and 48 and a fluid pressure actuated motor 49 for applying the brake shoes to a brake drum 50. The brake for each of the front road wheels 51 of the vehicle is similar to the brakes for the rear wheels and comprises brake shoes 52 and 53 and a fluid pressure actuable motor 54 for engaging the brake shoes with a drum 55. A conduit 56 is connected with the motor 49 for each of the rear brakes and a conduit 57 is connected with each of the motors 54 for the front brakes, and a common conduit 58 is connected with the conduits 56 and 57 for applying fluid pressure to all of the latter conduits.

A master cylinder 59 comprising a piston 60 is provided for supplying fluid under pressure to an outlet conduit 61 when the brake pedal 62 of the vehicle is depressed. The brake pedal 62 is connected with the piston 60 by means of a push rod 63. In usual installations, the conduits 61 and 58 are directly connected together so that fluid pressure is supplied from the master cylinder 59 to each of the brake motors 49 and 54 for applying the brakes when the pedal 62 is depressed. In accordance with the principles of the present invention I have inserted a valve mechanism 64 between the conduits 61 and 58 which is controlled both in accordance with the position of the accelerator 65 of the vehicle and also in accordance with the speed of the vehicle, so that when the accelerator is in a closed throttle position and the speed of the vehicle is below some relatively low value, for example 5 M. P. H., the brake motors 49 and 54 are kept energized, after having been previously energized by movement of the brake pedal 62, regardless of the fact that the brake pedal 62 is released by the vehicle operator, and any torque transmitted by the torque converter 17 to the driven shaft 16 and the rear road wheels 15 of the vehicle, with the engine 10 operating at idling speed, is ineffective to move the vehicle due to the action of the engaged vehicle brakes.

The valve mechanism 64 comprises a casing 66 having an inlet port 67 and an outlet port 68. The inlet port 67 is connected with the conduit 61 from the master cylinder 59, and the outlet port 68 is connected with the conduit 58 leading to the brake motors 49 and 54. A cage 69 is movably disposed in the casing 66 and comprises end plates 70 and 71 connected by means of spaced rods 72. The plate 71 is provided with an aperture 73 therethrough, and an annular rubber grommet 74 as positioned in the aperture 73 in the plate 71 and has a central opening 75 therethrough. The rubber grommet 74 is adapted to seat within the upper end of the port 67 so as to seal the port. A steel ball 76 is slidably disposed within the cage 69 between the rods 72, and the ball is adapted to seat on top of the rubber grommet 74 for sealing the opening 75 through the grommet.

A shaft 77 is swingably disposed within the casing 66 and has a flatted side portion 78. The shaft 77 is connected with a lever 79 located on the exterior of the casing 66 and is adapted to be swung by means of the lever so that an end of the flatted side 78 contacts the plate 70 of the cage 69 and moves the cage upwardly so as to disengage the grommet 74 with the sides of the port 67. A spring 80 is provided between the plate 70 of the cage 69 and the adjacent upper end of the casing 66 for yieldably holding the cage 69 in its illustrated position with the rubber grommet 74 sealing the port 67.

A fluid pressure actuated motor 81 is provided for moving the lever 79, and the motor comprises a piston 82 slidably disposed in a hollow casing 83 and connected by means of a rod 84 with the lever 79. A spring 85 is disposed between the piston 82 and an end of the casing 83 for moving the piston 82 in one direction, and the casing 83 is provided with a port 86 for supplying fluid pressure within the casing for moving the piston in the opposite direction. A conduit 87 is connected with the port 86 for supplying fluid pressure to the port as will hereinafter be described.

A valve 88 is connected with the conduit 87 and is connected with still another conduit 89. The valve 88 comprises a rotatable valve core 90 disposed in a casing 91. The casing 91 is provided with ports 92 and 93 respectively connected with the conduits 89 and 87 and a bleed port 94 for freely discharging fluid therethrough, preferably to the sump 31. The valve core 90 is provided with a flat side 95 for connecting the ports 92 and 93 or the ports 93 and 94, depending on the rotative position of the core 90. The valve core 90 is adapted to be rotated by means of a lever 96 connected by means of a link 97 with the vehicle accelerator 65. The accelerator 65 is connected by any ordinary linkage, such as a rod 98 with the throttle lever 13 of the engine carburetor 12.

The conduit 89 is connected with a speed controlled valve 99 which is also connected with the conduit 32. The valve 99 comprises a valve piston 100 slidably disposed in a valve casing 101. The casing 101 is provided with ports 102, 103 and 104. The ports 102 and 103 are respectively connected with the conduits 89 and 32, and the port 104 is a bleed port adapted to freely discharge fluid therethrough, preferably into the sump 31. The valve piston 100 is provided with lands 105 and 106 and a groove 107 between the lands.

A governor 108 is provided for actuating the valve 99 and comprises centrifugal force responsive balls 109 linked to end members 110 and 111. The member 111 is connected to the piston 100 so that the member 111 transmits any longitudinal movement given it by the centrifugally operated balls 109 to the valve piston 100 to give it a similar movement, the end member 110 being axially stationary. The governor 108 is rotated from the transmission driven shaft 16 by means of a shaft 112, with respect to which the end member 110 is fixed, and gearing 113 comprising a gear 114 fixed on the shaft 112 and a gear 115 fixed on the transmission driven shaft 16 and in mesh with the gear 114.

In operation of the braking system, assuming that the speed of the vehicle is below a predetermined low value, such as, for example, 5 miles per hour, the valve piston 100 of the governor valve 99 is in its illustrated position connecting the ports 102 and 103 by means of the groove 107 in the valve piston. Assuming also that the vehicle accelerator 65 is in its illustrated closed throttle position, the valve core 90 is in its illustrated position. Fluid pressure is thus supplied from the front pump 30, through the conduit 32, the valve 99, the conduit 89, the valve 88 past the flat side 95 of the valve core 90 and the conduit 87 to the fluid pressure actuated motor 81. The piston 82 of the motor is thus held by fluid pressure against the action of the spring 85 in its illustrated position and holds the lever 79 in its illustrated position in which the shaft 77 is turned with its flat side 78 substantially horizontal as shown. In this position of the shaft 77, it is out of contact with the upper plate 70 of the cage 69 in the valve mechanism 64 so that the rubber grommet 74 is in its illustrated position closing the port 67, and the ball 76 rests on top of the grommet as illustrated. When the brake pedal 62 is then operated to move the piston 60 in the master cylinder 59 so as to apply fluid pressure within the conduit 61, the fluid pressure in this conduit flows through the ports 67 and 75 and raises the ball 76 off the upper end of the grommet opening 75 so that fluid passes into the hollow casing 66. Fluid under pressure passes from the casing 66 through its port 68 and through the conduits 58, 57, and 56 to the apply cylinders 54 and 49 for the front and rear brakes of the vehicle, and the vehicle is thus braked under the vehicle operator's control.

When the brake pedal 62 of the vehicle is released by the vehicle operator, as for example after he has brought the vehicle to a stop, the fluid pressure in the conduit 61 is released; however, the valve mechanism 64 maintains the fluid pressure in the conduits 58, 57 and 56 and in the brake actuating motors 49 and 54 without substantial decrease so that the vehicle brakes remain applied, and any torque transmitted through the hydraulic torque converter 17 with the engine 10 at idling speed is not effective to cause any movement of the vehicle. The fluid pressure in the conduits 58, 57 and 56 and in the brake motors 49 and 54 is impressed on the upper side of the ball 76 so as to maintain it in its illustrated position closing the central passage 75 in the grommet 74, and the fluid under pressure in the conduits 58, 57 and 56 and in the motors 49 and 54 cannot return to the master cylinder 59. This condition obtains as long as the vehicle accelerator 65 is allowed to remain in its closed throttle released position in which it is illustrated and in which position it maintains the valve core 90 in its illustrated position connecting the ports 92 and 93 by means of its flat side 95.

When the accelerator 65 is substantially moved from its closed throttle position toward its open throttle position so as to move the throttle lever 13 of the engine carburetor 12 in a carburetor opening direction through the action of the rod 98, the vehicle brakes are automatically released through the action of the valve 88, and the increased speed of the engine 10 with this opening of the carburetor 12 causes more torque to be transmitted through the hydraulic torque converter 17 and the planetary gear set 18 so that the vehicle begins to move forwardly. This throttle opening movement of the accelerator 65 through the intermediaries of the link 97 and lever 96 causes rotation of the valve core 90 clockwise so that the valve core 90 closes the port 92 and connects the port 93 with the port 94. The fluid under pressure existing in the motor 81 is thus drained through the conduit 87, the port 93 and port 94 to allow the spring 85 to move the piston 82 to the right as seen in the figure. This movement of the piston 82 causes corresponding movement of the rod 84 and corresponding rotation of the lever 79 and shaft 77 in the clockwise direction so as to engage an edge of the flat side 78 of the shaft 77 with the upper plate 70 of the cage 69 and move the cage 69 upwardly and the grommet 74 fixed in the lower plate 71 of the cage off of the port 67. The port 67 is then in communication with the port 68 in the valve casing 66, and fluid under pressure within the conduits 58, 57 and 56 and in the brake motors 49 and 54 freely discharges through the ports 67 and 68 and through the conduit 61 back to the master cylinder 59, so that the brakes of the vehicle disengage. The vehicle then travels forwardly without any braking action by the front and rear wheel brakes.

Fluid pressure is available in the conduit 89 for providing this braking effect, subsequent to a manual application of the wheel brakes by means of the brake pedal 62, whenever the speed of the vehicle is below the critical speed of the governor 108 at which time the groove 107 of the valve piston 100 connects the conduits 32 and 89. Above this critical speed of the governor 108, the governor valve 99 blocks the conduit 32 with respect to the conduit 89 so that no fluid pressure exists in the latter conduit, and, even though the vehicle accelerator 65 is released just prior to an application of the vehicle brakes by means of the brake pedal 62, the ball 76 and grommet 74 in the valve 66 do not continue the application of the wheel brakes after release of the brake pedal 62. In this case, with no fluid under pressure from the conduit 89 applied to the piston 82, the spring 85 is effective to hold the lever 79 and shaft 77 rotated in the clockwise direction by means of the link 84, so that an edge of the flat 78 on the shaft 77 bears against the upper plate 70 of the cage 69 and holds the cage 69 and the ball 76 therein elevated with the grommet 74 being separated from the upper end of the port 67 whereby there is free communication between the ports 67 and 68 for both directions of fluid flow. The governor 108 is driven through the gears 115 and 114 from the driven shaft 16 of the transmission, and the governor balls 109 are rotated through this connection with the driven shaft 11. The centrifugal force on the balls 109 tends to move them outwardly and move the member 111 and valve piston 100 upwardly as seen in the drawing so that the land 105 blocks the port 103 of the conduit 32, and the ports 104 and 102 are connected by means of the groove 107 when the speed of the driven shaft 16 of the transmission is above the value corresponding to the predetermined low vehicle speed. Any fluid within the conduit 89 is thus vented through the bleed port 104 of the governor valve 99. Thus there is no fluid pressure available in the conduit 89 for application to the hydraulic motor 81 for the valve 64 when the accelerator 65 is moved into its closed throttle position. However, when the speed of the vehicle drops below this predetermined vehicle speed, the governor 108 likewise decreases in speed and the balls 109 move inwardly and move the member 111 of the governor 108 and the valve piston 100 of the valve 99 downwardly as seen in the figure so as to connect the ports 103 and 102 by means of a groove 107, substantially as illustrated. Fluid pressure is then again present in the conduit 89 so that when the accelerator 65 is in its closed throttle position, the fluid pressure is applied again to the piston 82 past the flat side 95 of the valve core 90 of the accelerator valve 88, and the grommet 74 is again seated on the upper end of the port 67 of the valve casing 66. Assuming that the accelerator has been released in this manner just prior to an application of the vehicle brakes by means of the brake pedal 62, the brakes are maintained engaged until the accelerator 65 is again moved toward its open throttle position, as has been previously explained.

My improved brake control mechanism advantageously prevents a disapplication of the vehicle brakes after they have once been applied by the vehicle operator so as to prevent movement of the vehicle due to the torque transmitted through the hydraulic torque converter in the transmission under idling speeds of the vehicle engine. This continuation of braking effect is under the control of the vehicle accelerator so that it is immediately discontinued when the vehicle operator moves the vehicle accelerator toward an open throttle position for the purpose of starting the vehicle. This continuation of braking effect by my improved controls furthermore advantageously is under governor control so that the mechanism is not operative to continue application of the vehicle brakes above a predetermined low speed of the vehicle, and the mechanism is only operative when the vehicle is brought to a substantial stop at which time the vehicle operator desires that the vehicle shall be and remain completely stopped.

I wish it to be understood that my invention is not to be limited to the specific constructions and arrangements shown and described, except only in so far as the claim may be so limited, as it will be understood to those skilled in the art that changes may be made without departing from the principles of the invention.

I claim:

In an automotive vehicle, the combination of a vehicle driving motor, an accelerator for the motor, vehicle road wheels, means drivingly connecting certain of said road wheels and said motor and including a hydrodynamic coupling device which transmits an appreciable vehicle driving torque to said last-named road wheels at engine idling speeds, brakes for certain of said road wheels of the vehicle, a fluid pressure operated motor for engaging each of said brakes, a master cylinder hydraulically connected with said brake motors and including a manually actuated operator for producing a fluid pressure from said master cylinder effective on said brake motors for engaging the brakes, a centrifugal governor responsive to changes in speed of the vehicle, a check valve hydraulically connected between said master cylinder and said brake motors for freely allowing fluid pressure to be impressed on said brake motors from said master cylinder and when energized maintaining fluid pressure impressed on the brake motors originally produced by said master cylinder even though said master cylinder operator is deactuated, a hydraulic motor including a piston for energizing said check valve for rendering it effective when fluid pressure is applied to the piston and including a spring for deenergizing the check valve, a source of fluid pressure, and two valves connected in series with said check valve motor and with said source of fluid pressure, one of said valves being connected with said accelerator and the other valve being connected with said centrifugal governor whereby to connect said fluid pressure source with said check valve motor for energizing the check valve when the accelerator is in a closed throttle position and the speed of the vehicle is below a pre-determined value.

JOHN B. POLOMSKI, Jr.

References Cited in the file of this patent

UNITED STATES PATENTS

| Number | Name | Date |
|---|---|---|
| 2,259,810 | Freeman | Oct. 21, 1941 |
| 2,272,320 | Freeman | Feb. 10, 1942 |
| 2,277,584 | Freeman | Mar. 24, 1942 |
| 2,284,189 | Dick | May 26, 1942 |
| 2,287,301 | Freeman | June 23, 1942 |
| 2,308,822 | Murphy | Jan. 19, 1943 |
| 2,313,232 | Freeman | Mar. 9, 1943 |
| 2,313,430 | Goepfrich | Mar. 9, 1943 |
| 2,408,008 | Tipton | Sept. 24, 1946 |
| 2,410,333 | Barkeij | Oct. 29, 1946 |
| 2,549,125 | Paton | Apr. 17, 1951 |